(12) United States Patent
Grantz et al.

(10) Patent No.: US 6,322,252 B1
(45) Date of Patent: Nov. 27, 2001

(54) DISCRETE FLUID DYNAMIC BEARINGS

(75) Inventors: Alan Lyndon Grantz; Gunter Karl Heine, both of Aptos, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/292,098

(22) Filed: Apr. 14, 1999

Related U.S. Application Data

(60) Provisional application No. 60/086,364, filed on May 19, 1998.

(51) Int. Cl.$^7$ .................................................... F16C 32/06
(52) U.S. Cl. ............................................ 384/124; 384/110
(58) Field of Search ................................. 384/100, 107, 384/110, 108, 130, 132, 291, 292, 124; 360/99.08

(56) References Cited

U.S. PATENT DOCUMENTS

| | | | |
|---|---|---|---|
| 3,484,143 | * 12/1969 | Tallian et al. | 384/110 X |
| 5,246,294 | * 9/1993 | Pan | 384/110 X |
| 5,855,437 | * 1/1999 | Lee | 384/110 |
| 5,947,608 | * 9/1999 | Kim | 384/110 |
| 5,980,113 | * 11/1999 | Grantz | 384/108 |
| 6,019,516 | * 2/2000 | Leuthold et al. | 384/110 |

* cited by examiner

*Primary Examiner*—Thomas R. Hannon
(74) *Attorney, Agent, or Firm*—Thomason, Moser & Patterson, L.L.P.

(57) ABSTRACT

A discrete fluid dynamic bearing comprising a fluid dynamic bearing including a bearing cone mounted on a sleeve and defining in cooperation with a bearing seat having a surface facing an outer surface of the bearing cone across a fluid bearing gap, a first seal establishing a pressure gradient from a distal end of the sleeve toward the gap of the fluid dynamic bearing and a second seal on an opposite side of the fluid dynamic bearing from the first seal for establishing a positive, higher pressure toward the fluid bearing gap, the press established by the first and second seals maintain the fluid in the gap during relative rotation of the surfaces of the fluid dynamic bearing.

23 Claims, 6 Drawing Sheets

DISCRETE FLUID DYNAMIC BEARINGS

CROSS-REFERENCE TO RELATED APPLICATION

This invention is based on U.S. Provisional Patent Application, Ser. No. 60/086,364, filed May 19, 1998, assigned to the assignee of this application and incorporated herein by reference.

FIELD OF THE INVENTION

The present invention relates to fluid dynamic bearings, and more specifically, the present invention relates to a self-contained, discrete fluid dynamic bearing which is a functional equivalent to, and/or replacement for a traditional ball bearing.

BACKGROUND OF THE INVENTION

The bearing assembly which supports a shaft and sleeve for relative rotation is of critical importance to the lifetime and stability of a motor, gyroscope or other devices based on relative rotation. However, ball bearing assemblies have many mechanical problems such as wear, run-out and manufacturing difficulties. Moreover, resistance to operating shock and vibration is poor, because of low damping. Thus, there has been a search for alternative bearing assemblies.

One alternative bearing design which has been investigated is a hydrodynamic bearing. In a hydrodynamic bearing, a lubricating fluid such as gas or a liquid provides a bearing surface between a fixed member of the housing and a rotating member of the disc hub. Typical lubricants include oil or ferromagnetic fluids. Hydrodynamic bearings spread the bearing interface over a large continuous surface area in comparison with a ball bearing assembly, which comprises a series of point interfaces. This is desirable because the increased bearing surface reduces wobble or run-out between the rotating and fixed members. Further, improved shock resistance and ruggedness is achieved with a hydrodynamic bearing. Also, the use of fluid in the interface area imparts damping effects to the bearing which helps to reduce non-repetitive runout.

However, to design an effective self-contained fluid dynamic bearing, the issue of fluid retention must be addressed. If fluid is lost during operation of the bearing, or in the event of shock, then the effectiveness of the bearing is diminished or lost.

SUMMARY OF THE INVENTION

Therefore, it is an object of the present invention to provide a discrete, self-contained hydrodynamic bearing.

More specifically, it is an object of the invention to provide a self-contained hydrodynamic bearing which may be utilized as a direct substitute for a ball bearing.

A further objective of the invention is to provide a hydrodynamic bearing incorporating the functional equivalent of inner and outer races so that the hydrodynamic bearing may be easily used in a system which requires relative rotation of two parts with substantial stability.

Another objective of the invention is to provide a discrete fluid dynamic bearing which can be delivered for installation filled with fluid and with the bearing gap pre-established.

Yet another objective of the invention is to provide a discrete fluid dynamic bearing wherein a sleeve supports structure to serve as an inner race and a bearing seat serves as an outer race.

A further and related objective of the invention is to provide a self-contained hydrodynamic bearing where the bearing is substantially conical or spherical in shape so that it provides a measure of both radial and axial stability to the system being supported.

Yet another objective of the present invention is to provide a self-contained conical bearing which may be easily filled with the fluid which serves as the bearing surface.

Another objective of the invention is to provide a self-contained conical bearing which is easily filled with fluid.

A further objective of the invention is to provide a fluid-filled self-contained conical bearing incorporating means for sealing the fluid into the bearing located on either side of the bearing column.

Yet another objective of the invention is to provide means incorporated in the design and a procedure for easily filling the bearing with the required fluid level for efficient operation.

Yet another objective of the invention is to provide active sealing means on at least one side and preferably both sides of the bearing cone or sphere so that the fluid is actively maintained with the bearing while the system is rotating.

Yet another objective of the invention is to achieve a design for a seal system which actively pushes the oil back into the fluid dynamic bearing capsule while it is spinning; a further objective is to combine this approach with the use of capillary tension to hold the oil in the fluid dynamic bearing during stationary periods.

Yet another objective of the invention is to achieve a seal design which allows air, trapped within the seal and the associated fluid dynamic bearing, to be expelled, eliminating air bubbles from the fluid dynamic bearing.

These and other objectives of the present invention are achieved by providing a discrete, self-contained fluid dynamic bearing comprising a sleeve supporting on its outer surface a bearing cone and cooperating with a bearing seat having an inner surface; one of the surfaces has grooves to establish and maintain fluid pressures so that an effective fluid bearing is established. A fluid dynamic bearing is defined by providing for fluid to be maintained on the surface of the bearing cone. Typically, the fluid also is found in channels on the outer surfaces of the bearing cone, including grooves or channels between the bearing cone and the outer surface of the sleeve.

In one preferred embodiment, facing surfaces of a seal cone mounted on the sleeve adjacent the bearing cone and seal shield supported on the bearing seat provide a tapered gap through which fluid may be inserted into the active surfaces of the hydrodynamic bearing, the gap being tapered to form a meniscus to retard or prevent the flow of the fluid back out through this opening. The relative rotation of the seal shield and the seal cone create a pressure through centrifugal force which causes the bearing fluid to be forced toward the bearing cone. At the opposite end of the sleeve of the bearing, the fluid is retained in the bearing device either by providing slightly tapered surfaces for the bearing seat and the sleeve to form a meniscus, or by providing a grooved pumping seal which actively seals the fluid within the bearing.

In an especially preferred embodiment of the invention, an asymmetric sealing system and method is employed on either side of the hydrodynamic bearing in the bearing device. This asymmetric sealing technique incorporates, in addition to the above centrifugal capillary seal, a grooved pumping seal on the opposite side of each fluid dynamic bearing from the centrifugal capillary seal and between the fluid dynamic bearing and a central portion of the sleeve. This grooved pumping seal is a seal formed between a sleeve and the bearing seat, with pumping grooves being defined on at least part of the seat or sleeve. These pumping grooves retain bearing fluid within the grooved pattern when the sleeve and seat are stationary; when the parts are relatively rotating, the oil is pumped into a region of the seal which has very shallow or no grooves, dramatically enhancing the sealing stiffness of the sealing system. By one measurement, this grooved pumping seal is over 60 times stiffer than the centrifugal capillary seal which is on the opposite side of the fluid dynamic bearing.

In a further advantageous portion of this design, the surface of the fluid dynamic bearing uses a grooving pattern and, in some embodiments, a varying gap width which varies over the bearing surface of the cone (or sphere) with distance from the wider radius of the cone toward the narrower radius to provide a slightly unbalanced pressure distribution. Thus the fluid flow is in the direction from the centrifugal capillary seal to the grooved pumping seal; this is accomplished even with variations in manufacturing tolerances in parts and assembly. By establishing this pressure distribution over the surface of the fluid bearing, air bubbles are pushed to the apex of the bearing cone or bisphere and are expelled through the centrifugal capillary seal.

The invention further comprises means and a method for filling the discrete fluid dynamic bearing with fluid and setting the gap. Basically, the method comprises injecting a fixed amount of fluid into the bearing, and then pressing a typically ring-shaped cone gap positioner and bearing shipping protector axially against the seal shield of the bearing. The positioner is used to displace the shield a given amount, axially toward the center of the bearing. Since the fluid is already present in the bearing, the pressure created by this physical displacement sets the gaps within the bearing and disperses the fluid throughout the fluid bearing gap. The ring is left in place for shipment; after the inner and outer races of the discrete bearing are bonded in place in the product under assembly, the ring can be removed and the fluid bearing is operational.

Other features and advantages of the present invention will become apparent to a person of skill in the art who studies the following invention disclosure which is given with respect to the following figures.

DETAILED DESCRIPTION OF A PREFERRED EMBODIMENT

Figure 1:
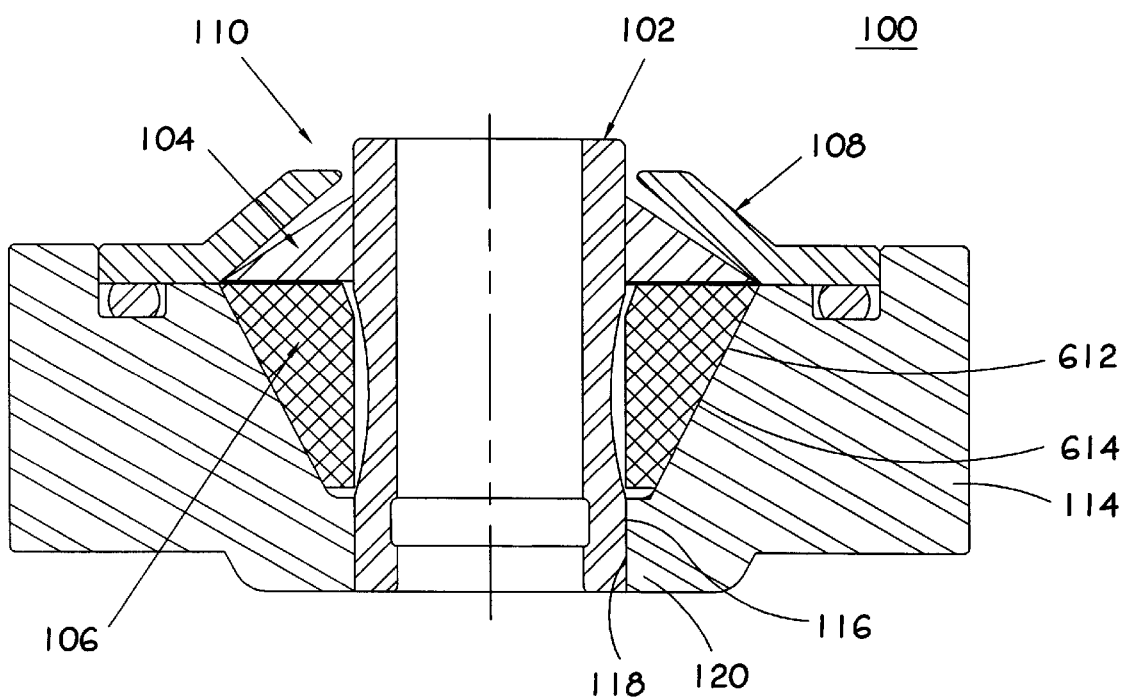
FIG. 1 is a vertical sectional view of the self-contained conical bearing of this invention.

As noted above, FIG. 1 is a vertical sectional view of a self-contained fluid dynamic bearing which is designed to be used in many of the same situations where a ball bearing would be used. It is apparent that it could be, for example, in any type of motor or other rotating device, not being limited to AC or DC motors. The viscosity of the fluid usable in the bearing could range from zero to substantially higher numbers, the fluids including air, oil, grease and other fluids. The self-contained fluid bearing of the invention could be used in combination with other types of bearings. It should be noted that the primary limitation on the use of this design is that it is only unidirectional because of the use of grooves to establish the pressures within the bearing. Where two of the bearing devices are being used together, for example at opposite ends of a shaft to support a sleeve for rotation, so that the conical bearing at one end of the sleeve would appear oriented as shown in FIG. 1 and the bearing at the opposite end of the sleeve would be rotated 180° from the showing of FIG. 1, then the set of grooves for one self-contained bearing device would be the mirror image of the set of grooves on the device at the opposite end of the sleeve. Aside from this limitation, it is believed that this self-contained bearing could easily be used in any system to support a rotating or fixed sleeve for relative rotation between that shaft and a surrounding sleeve, even if both rotate in the same direction but at relatively different rates.

Referring specifically to FIG. 1, this figure shows an exemplary embodiment of a self-contained fluid dynamic bearing 100. The bearing comprises a sleeve 102 which supports on its outer surface a seal cone 104 and a bearing cone 106. The seal cone 104 cooperates with a seal shield 108 to form a centrifugal capillary seal generally indicated at 110 which provides a means for inserting the fluid into the fluid bearing as well as a means for providing a positive pressure to maintain the fluid within the bearing. At the opposite end of the bearing cone, the bearing seat 114 has an inner surface 116 which cooperates with the outer surface 118 of the sleeve 102 to form a grooved pumping seal which will be described in detail below. As with the centrifugal seal at the opposite end, the grooved pumping seal provides a means for retaining the fluid within the fluid dynamic bearing by establishing a capillary seal when the system is at rest; the grooved pumping seal which is generally indicated at 120 which is defined between the two surfaces 116, 118 also provides a means for establishing a positive sealing pressure toward the fluid dynamic bearing so that when the bearing is operating, the fluid is positively retained within the fluid dynamic bearing to prevent fluid loss from the bearing.

An advantage of the design, among others, is that it does not require a close balance of pressure between the top and bottom of the bearing of the self-contained device. Further, the centrifugal capillary seal 110 (used alone or in combination with the groove pattern and gap spacing of the FDB which establish a pressure gradient away from the open end of the sleeve and apex of the bearing cone), provides a means for expelling air bubbles from the fluid in the fluid dynamic bearing. In addition, by combining the characteristics of the centrifugal capillary seal generally indicated at 110 (which provides a means for pushing fluid toward the fluid bearing when the motor is spinning and for holding the fluid in the gap when the motor is at rest), and the grooved pumping seal generally indicated at 120 (which provides a means for holding and sealing the fluid in the FDB), the fluid is positively maintained within any fluid dynamic bearing located between these seals and in the self-contained device.

Figure 2A:
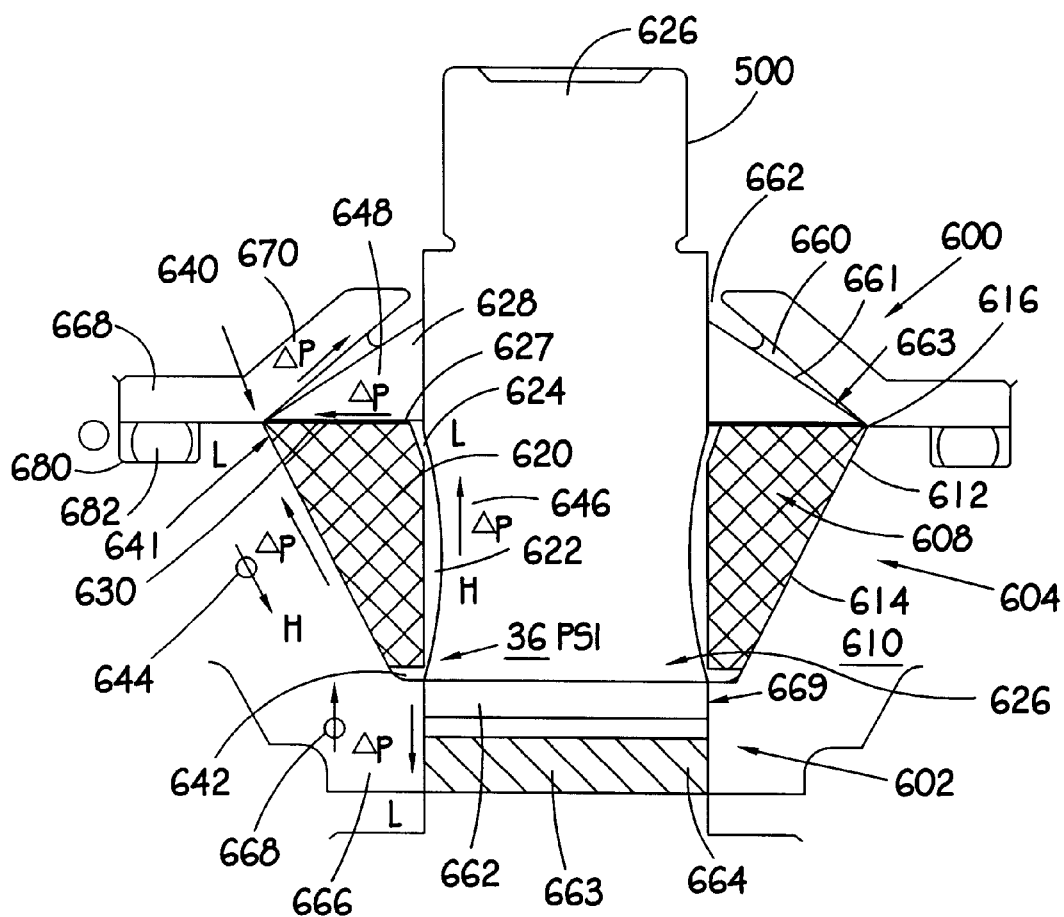
FIG. 2A is a vertical sectional view of the hydrodynamic bearing.
Figure 2B:
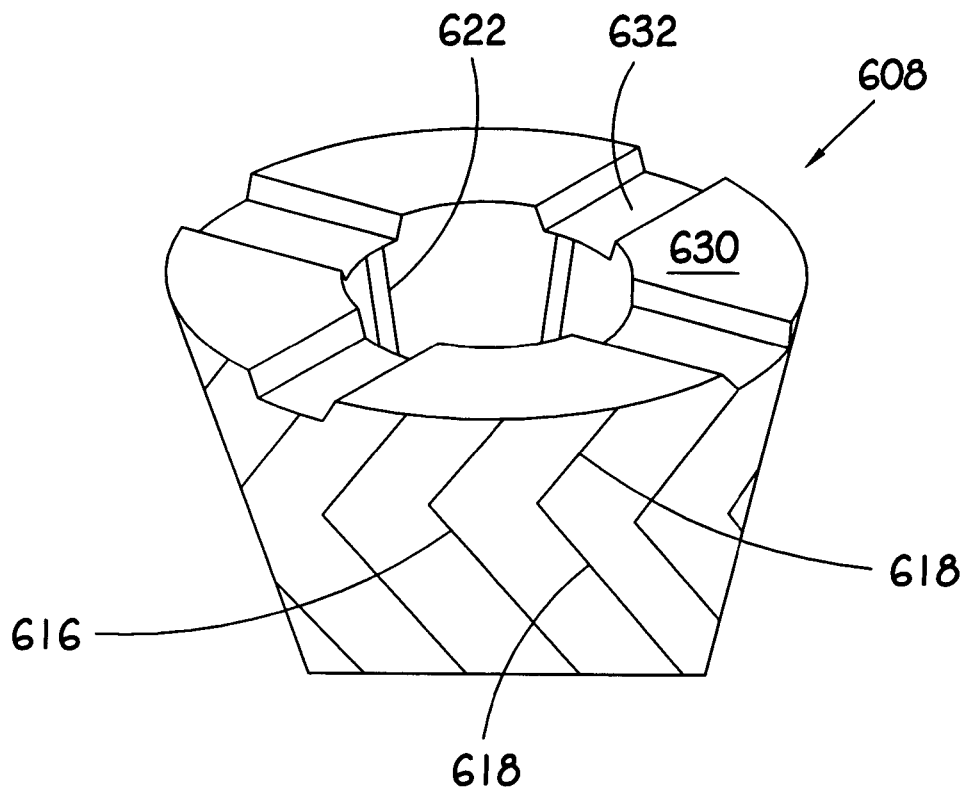
FIG. 2B is a perspective view of a typical bearing cone used in the fluid dynamic bearing of FIG. 2A.

The operation of the fluid dynamic bearing in supporting the system for rotation can best be understood by reference to FIGS. 2A and 2B. In considering the operation it should be remembered that the sleeve 102 together with the bearing cone 106 serves as the inner race of the bearing; while the bearing seat 114 serves as the outer race. Considering FIG. 2A, the primary support system in the bearing comprises the bearing cone 608 and the surrounding bearing seat 610 whose faces 612, 614 define a gap filled with fluid which serves as the bearing to allow relative rotation. The faces 612, 614 are separated by gap 616 of about five microns (although this dimension is representative of example only; it may be greater or less depending on the tolerances achieved by parts and assembly methods). Fluid fills this gap 616, and is maintained under pressure within this gap by grooves 618 on the surface of the bearing cone 608 (shown in FIG. 2B) at least when the faces are relatively rotating. To allow for fluid circulation, and maintenance of the fluid in the gap 616, the gap is extended over the back surface 620 of the bearing cone 608 by providing flow channels, or grooves 622 running linearly along the back surface of the cone or the facing surface 624 of the sleeve. These channels 622 allow the fluid to pass axially toward the distal end 626 of the sleeve 500. The path or bearing gap for the fluid is completed through a gap between a wall 627 of the sealing cone 628 and the upper surface 630 of the bearing cone 608. Most efficiently, the path is through flow channels or grooves 632 formed in the top surface 630 of the cone 608 (see the cone detail in FIG. 2B), although the grooves could also be provided in the complementary surface of the sealing cone 628.

In another embodiment, the bearing cone and seal cone would be combined in one piece, and the flow passages would be formed by holes extending from the outer surface of the cone to the axial flow passages; these holes could generally extend at any angle relative to the shaft axis.

As is shown by the arrows marked $\Delta p$ on FIG. 2A (indicating pressure gradients from high to low pressure), the pumping action of the grooves 618 on the face of the bearing cone 608 create a pressure differential from the apex 640 of the bearing cone toward the narrower end 642 of the cone. Thus, the fluid flow over the surface of the bearing cone 608 being generally from the point of lower to higher pressure, is as marked by the arrow 644 and continues axially toward the distal end 626 of the sleeve 500 following the path marked by arrow 646 and returns to the apex of the cone through the grooves 632 following the pressure arrow 648.

Figure 3:
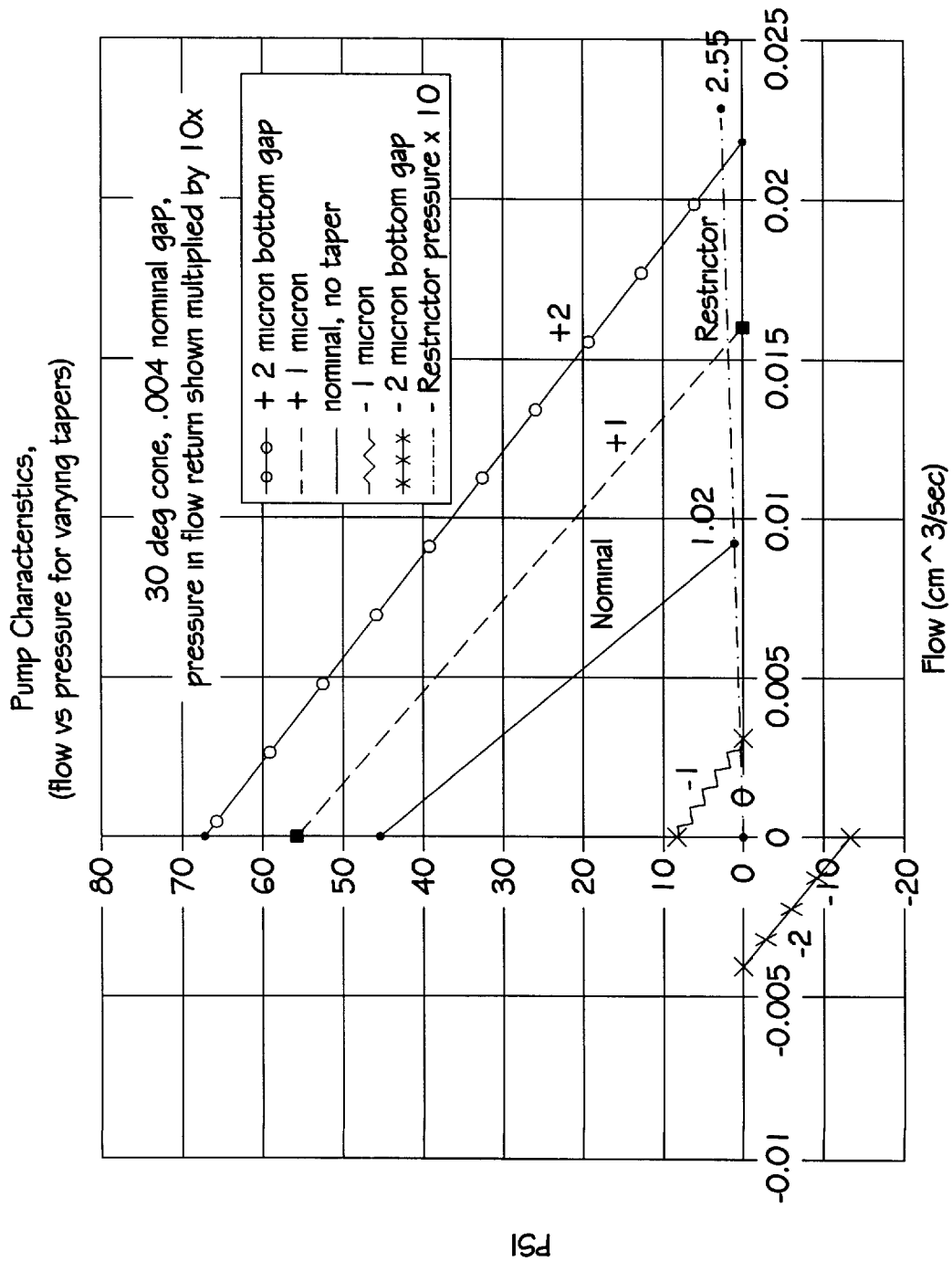
FIG. 3 is a graph of the pumping characteristics of the fluid dynamic bearing of FIG. 2A.
Figure 4A:
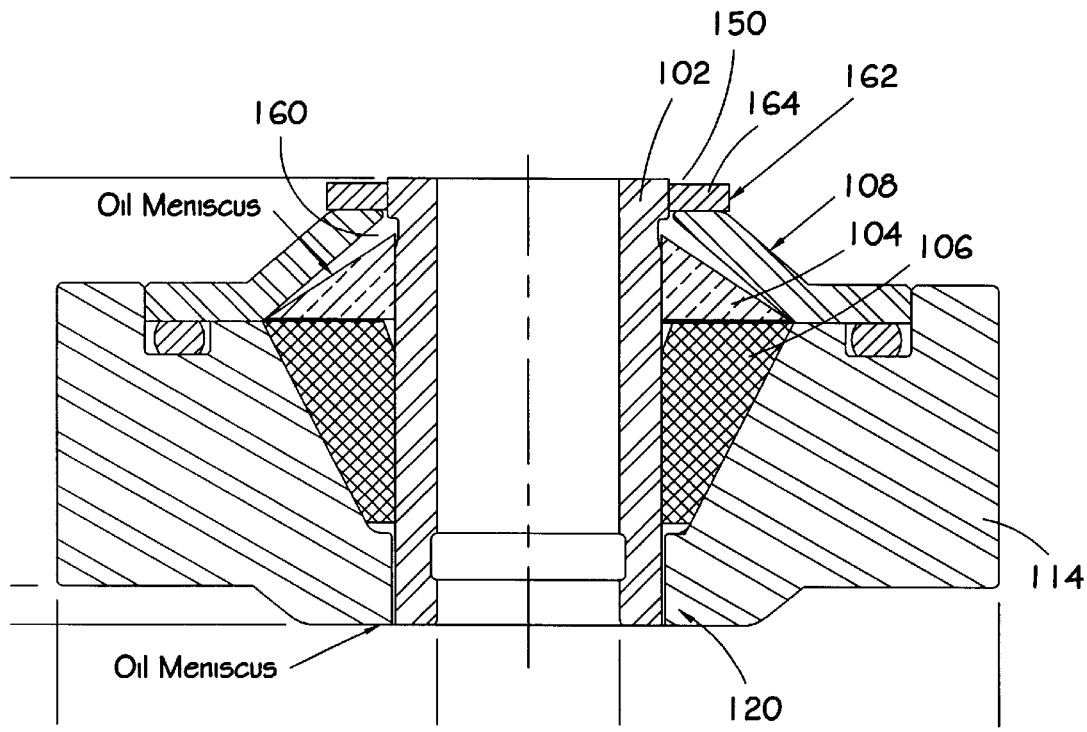
FIG. 4A is a vertical sectional view of an exemplary discrete bearing of FIG. 1 with the cone gap positioner in place.
Figure 4B:
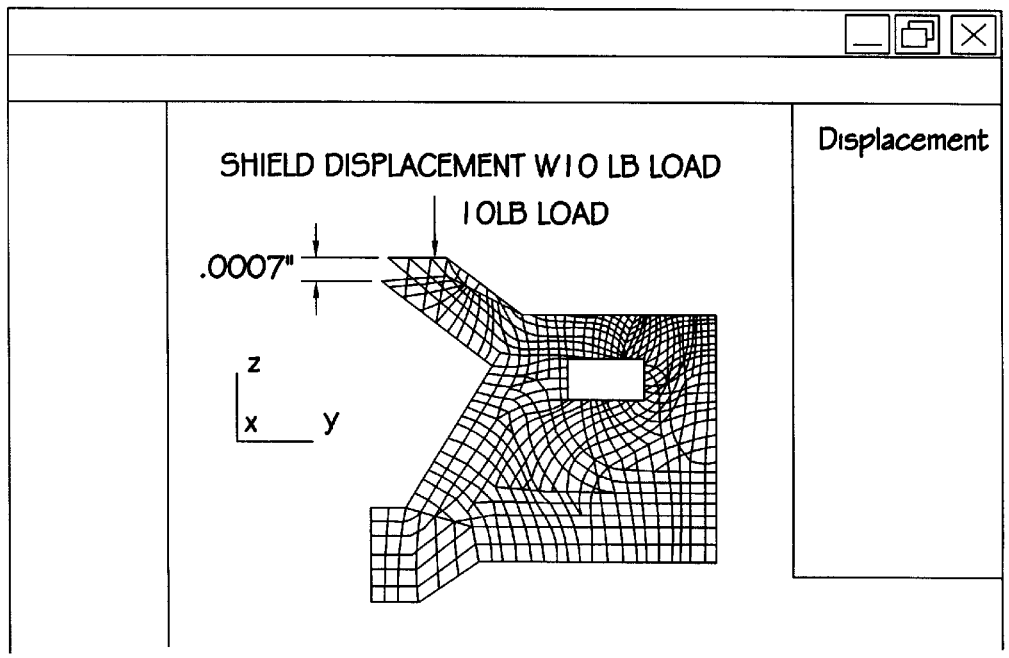
FIG. 4B is an illustration of the bearing seat and shield used in the discrete bearing device of FIG. 4A and useful in explaining the method by which the bearing gaps in the fluid dynamic bearing are set and stabilized.

In a preferred embodiment, the pressure gradient is maintained in the direction shown even though tolerance variations allow a varying width in the gap 616 between the surface of the cone 608 and the facing surface of the bearing seat 610 which form the fluid dynamic bearing. As shown on the graph which comprises FIG. 3, the highest pumping pressure is achieved by providing a gap increase of 2 microns from the apex 640 at the broad end 641 of the bearing cone to the narrow end 642 of the pumping cone. The figure demonstrates that by providing this taper of the gap from apex to narrow end of the cone, that the pumping pressure is enhanced, and the ability to expel air bubbles from the system is also further enhanced. At the other tolerance extreme, a decrease of almost 2 microns (from apex 640 to cone narrow end 642) is allowable before the pressure and flow reverse. Reversal should not be allowed.

In order to provide a means for fluid to be inserted into the fluid dynamic bearing, as well as to provide a means for air bubbles to be expelled from the bearing 610, a centrifugal capillary seal 660 is incorporated into the design, leading from the open end 662 of the fixed sleeve 500, down to the apex 640, i.e. the common point of the exit of the capillary seal and an end of the fluid dynamic bearing. The seal is formed between a wall 661 of the shield seal 668 which rotates with and is supported from (or even integrated with) bearing seat 114, and wall 663 of seal cone 628 which is supported from the sleeve. The substantially radially directed diverging walls 661, 663 are separated by a measurable gap 662 at the axially outer end of the seal; the narrowest point is at or near the apex 640 of the sealed design adjacent the end of the fluid dynamic bearing gap 616. The centrifugal capillary seal 660 utilizes centrifugal force which is created by the relative rotation of the walls 661, 663 to create a pressure gradient represented by the arrow $\Delta p$, 670, to push oil back into the adjacent FDB whenever the motor is spinning. This pressure gradient across the capillary seal can also be used to fill the FDB with oil.

Establishing this combination of pressure gradients in the FDB and adjacent centrifugal capillary seal also provides a means for expelling air bubbles from the entire fluid dynamic bearing system. That is, some air bubbles may appear in the system and have a negative effect on performance. However, by establishing the pressure gradients represented by the various arrows $\Delta p$ over the surfaces of the bearing cone, and through the capillary seal, the air bubbles can be expelled. Specifically, it is known that when the pressures are established, and the relative rotation has been established, the air bubbles will move from the point of highest pressure to lowest pressure. Therefore, any air bubbles appearing in or near the quiet zone 669 of the groove pumping seal 602 (to be explained below) or near the narrow portion 642 of the bearing cone, or along any surface of the bearing cone will move toward the point of lowest pressure which is the apex 640 of the bearing cone 608 and sealing cone 628. Once reaching that point, the air bubbles will continue to the point of lowest pressure, i.e. moving out through the reservoir of the centrifugal capillary seal and being expelled through the meniscus of the capillary seal. Thus, this system operates to continuously purge itself of any air which might inadvertently enter the system, while very effectively sealing the fluid within the bearing system.

In a preferred embodiment, the pressure gradient is further enhanced by the location of the apex 619 of the herringbone grooves 618 on the surface of the bearing cone 608. The location of groove apex 619 is chosen to ensure an upward pressure gradient along the bearing surface toward the cone apex 640. This must be provided for the range of gaps between the cone 608 and the bearing seat 610. The herringbone grooves could also be located in the bearing seat 610. As shown on the graph which comprises FIG. 3, the highest pumping pressure is achieved when tolerances result in a taper increase of 2 microns from the apex of the bearing cone to the narrow end of the pumping cone. Thus, it is established that this taper effect of the gap from apex to narrow end of the cone, that the pumping pressure is enhanced, and the ability to expel air bubbles from the system is also further enhanced. The opposite is true when the taper causes the gap to be the largest at the cone apex 640.

In order to further enhance the sealing stiffness of the system, a grooved pumping seal 602 is provided, preferably immediately axially adjacent the base 642 of the bearing cone. This grooved pumping seal 602, in a preferred form, can be defined on the face of a central section 669 of the bearing seat 610 which also supports the outer one 616 of the two faces 614, 616 of the fluid dynamic bearing 604. In a preferred form, this grooved pumping seal 602 comprises a first ungrooved surface section or quiet zone 662 surrounding a portion of the ungrooved sleeve immediately adjacent the base 642 of the bearing cone, and a second grooved pumping region 664 which also closely surrounds an ungrooved section of the sleeve immediately adjacent the quiet zone 662. This grooved pumping seal 602 is intended to be a low volume, very high stiffness seal. It is a capillary seal which employs active pumping by virtue of the presence of relatively deep grooves 663 in one section 664 of the seal. When the bearing is at rest, the oil settles into the grooves but cannot pass further out of the self-contained bearing because of the capillary effect of the grooves and sleeve to seal the gap. When the bearing spins, the relative rotation of the sleeve 102 and the surrounding bearing seat surface section 664 of the grooved pumping seal create the pressure gradient indicated by the arrow Δp, 666. This causes an oil fluid flow out of the grooves into the quiet zone 660 as indicated by the arrow 668. It has further been found that the ratio of the width of the grooved pumping zone 664 to the ungrooved quiet zone 660 is about 3:1. Because of the narrow gap between the seal surface 664 and the surface of the sleeve, a substantial sealing stiffness adjacent the FDB bearing is created; sealing stiffness is defined as the change in pressure across the seal divided by the length of the seal; it represents the ability of the seal to retain fluid in the adjacent FDB. In the grooved pumping seal, because of this quiet zone, there is little pumping action to force the oil out of the grooved pumping seal into the fluid dynamic bearing, but a very strong boundary condition is established adjacent the FDB. Since the pressure gradient is strongly toward the FDB, fluid cannot escape the FDB, maintaining the fluid level in this discrete FDB. As explained above, any air bubbles which appear in the quiet zone would tend to move contrary to the pressure gradients in the fluid dynamic bearing and be expelled from the distal end of the sleeve through the centrifugal capillary seal; any further air bubbles which moved into the grooves of the groove section 664 could be expelled from the discrete FDB because of the strong pressure gradient created by the rotation of the grooved pumping seal.

Finally, it should be noted that it is strongly preferred that the depth of the grooves and/or the width of the grooves diminishes as the oil is moved up through the grooved pumping zones 664 into the quiet zone 660. This enhances and provides a means for pumping the oil efficiently out of the grooves into the quiet zone during bearing rotation without ingesting air, while providing a strong capillary effect in the grooves to maintain the oil in the grooved pumping seal 602 when the bearing is not rotating.

It should be further noted that although the preferred embodiment of this design discloses utilizing grooves on the central section of the bearing seat, a separate grooved piece could be provided separate and apart from the bearing seat; and in a further alternative, that the central section of the bearing seat which surrounds the sleeve could be left entirely smooth, and the grooves instead imposed upon the sleeve.

In summary, this asymmetrical seal design comprises three different elements: a centrifugal capillary seal (CCS), a grooved pumping seal (GPS) on the opposite side of the bea ring which opposes the centrifugal capillary seal, and a herringbone groove geometry on the cone which is balanced to pump fluid away from the CCS towards the GPS. Two actions are taking place as a result of this design: sealing, and air bubble purging. Sealing is accomplished with the two different kinds of seals. The CCS is a low stiffness, high volume seal. The GPS is a high stiffness, low volume seal. The stiffness of the seal is a measurement of its pressure change/unit fluid displacement, i.e., Pa/mm. For the design shown, the sleeve outer diameter is 5 mm. The stiffnesses are: centrifugal capillary seal (2343 Pa/mm at 7200 RPM for a pair); grooved pumping seal ($1.45 \times 10^5$ Pa/mm); double capillary seal (536 Pa/mm for a pair). The stiffness or the $$CCS \text{ is: } \frac{dp}{dr} = prw^2$$

or the stiffness ratios are:

GPS/capillary=270 to 1

GPS/CCS=60 to 1

CCS/Capillary=4 to 1

Although conventional capillary seals are not shown in this disclosure, they are used for comparison. The stiffness shown for the GPS is based on:

1.5 mm length or seal

25° groove angle seal gap=0.0005"=0.013 mm

50% land to groove ratio volume of oil is 0.23 $\mu$l

The CCS has a volume of oil of ≈1.7 $\mu$l or 7.4 times that of the GPS. The GPS would actually have a non-grooved, or quiet zone which would prevent all oil from being pumped out of the seal. The CCS can easily accommodate all the oil in the GPS. The GPS ensures that no oil is ejected out of the bearing, while the CCS serves as both a reservoir and a seal.

The CCS utilizes centrifugal force to push oil back into the bearing device. This is what makes it so much stiffer than a conventional capillary seal. The capillary (diverging shape) of the CCS allows oil to be sucked into the motor without using a vacuum system. The gap sizes in the seal draw in oil.

The self-contained fluid dynamic bearing described above provides a design which is a functional equivalent to and a replacement for a ball bearing. The design also differs from previously known conical/spherical fluid dynamic bearings in that it incorporates a sleeve 102 (FIG. 1). The sleeve 102 includes an adhesive groove 130 on an interior surface thereof so that the sleeve may be slipped or forced over a shaft (not shown) and glued in place so that the combination of sleeve 102 and bearing cone 106 function as the inner race of a bearing. In a preferred embodiment of the design, the sleeve 102 includes a shoulder 150 which defines the location axially of the sealing cone 104 and the bearing cone 106. It would be possible, of course, to put these cones 104, 106 on the sleeve and locate them using some mark or a measure axially along the sleeve; however, it will become apparent in the following description of the method for filling the fluid bearing with fluid and for setting the bearing gaps between the bearing cone 106 and the bearing seat 114 that the use of the shoulder 160 on the sleeve is highly advantageous. It should be noted that even with the shoulder, in a preferred embodiment the bearing cone 106 and seal cone 104 are press fit on the sleeve. As described above, grooves or passages are defined between the inner surface of the bearing cone 106 and the outer surface of the sleeve 102 to allow for fluid circulation between these two surfaces. It should also be noted that the fluid circulation grooves can be incorporated in either the outer surface of the sleeve 102 or the interior surface of the bearing cone 106; and that the fluid pumping grooves on the lower grooved pumping seal 120 described above can be located on either the bearing seat 114 or the outer surface of the sleeve. The use of the retaining shoulder 150 for axial retention of the seal cone 104 and bearing cone 106 allows a greater range i.e. looser tolerance of fits between the two cones and the sleeve than would be the case if the shoulder were not present. This is due to the fact that all axial forces on the bearing cone 106 are directed toward this retaining shoulder 150.

In order to make this discrete fluid dynamic bearing competitively efficient and available as a direct substitute for the ball bearing, it would be very important that the complete device with the bearing gaps preset and the fluid already in the system be preassembled and shipped as a self-contained unit. To achieve this goal, the self-contained bearing 100 is assembled as it appears in FIG. 1. A fixed amount of fluid is then injected into the fluid bearing gap, preferably the upper gap 160 which forms the wider opening of the centrifugal capillary seal. Then a cone gap positioner and bearing shipping protector comprising a split ring 162 or equivalent is slipped over the outer surface of the sleeve 102. Preferably, when it is installed, this cone gap positioner 162 is spread open further than the outer diameter of the sleeve 102 so that it does not grab the top of the sleeve. Instead, it is free to be brought to rest against the axial end 164 of the shield 108. In this example, the gap between the outer surface of the bearing cone 106 and the inner surface of the bearing seat 114 is desired to be set at about 0.0075 mm. To achieve this goal, a 375 N force is applied which pushes the ring against the shield with the objective being to push the shield down until it has compressed 0.015 mm. Obviously a different force could be applied or a different compression achieved with the target being to compress the shield 108 axially until it has depressed a distance which for the geometry shown, is two times the gap desired to be set. An axial force is also applied against the outer surface of the sleeve 102. When the force is applied, the sleeve also moves axially; and the shoulder 150 presses against the seal cone 104 and bearing cone 106, pressing them down until the bearing cone effectively bottoms out against the inner surface of the bearing seat 114. The positioner 164 is then allowed to grasp the sleeve.

At this point, the 375 N compression force is removed; the shield having been compressed, now returns to its normal configuration and lifts the ring and the sleeve which it firmly grasps by 0.015 mm. This will cause the bearing cone 106 to also move axially away from the bearing seat, creating a gap of 0.0075 mm. Thus by consistently using this approach, the gap can be consistently and reliably set at exactly the same gap distance. When the cone gap positioner and shipping protector 150 has returned to its initial position, an adhesive strip or spring or the like could be used to hold this ring 150 against the shield for shipment. The bearing and its opposing mate is now ready for installation by the customer. The inner race which effectively comprises the sleeve 102 and the cones 106, 104 which ride with it can now be bonded in place to serve as an inner race; the outer race, comprising the bearing seat or effective sleeve 114 and seal shield 108, can be bonded in place with no preload being necessary, thereby serving as the outer race. After cure, the positioning rings are removed and the assembly is now complete with the fluid filling the fluid bearing gap, the gaps properly set, and the inner and outer races firmly bonded in place.

Figure 5:
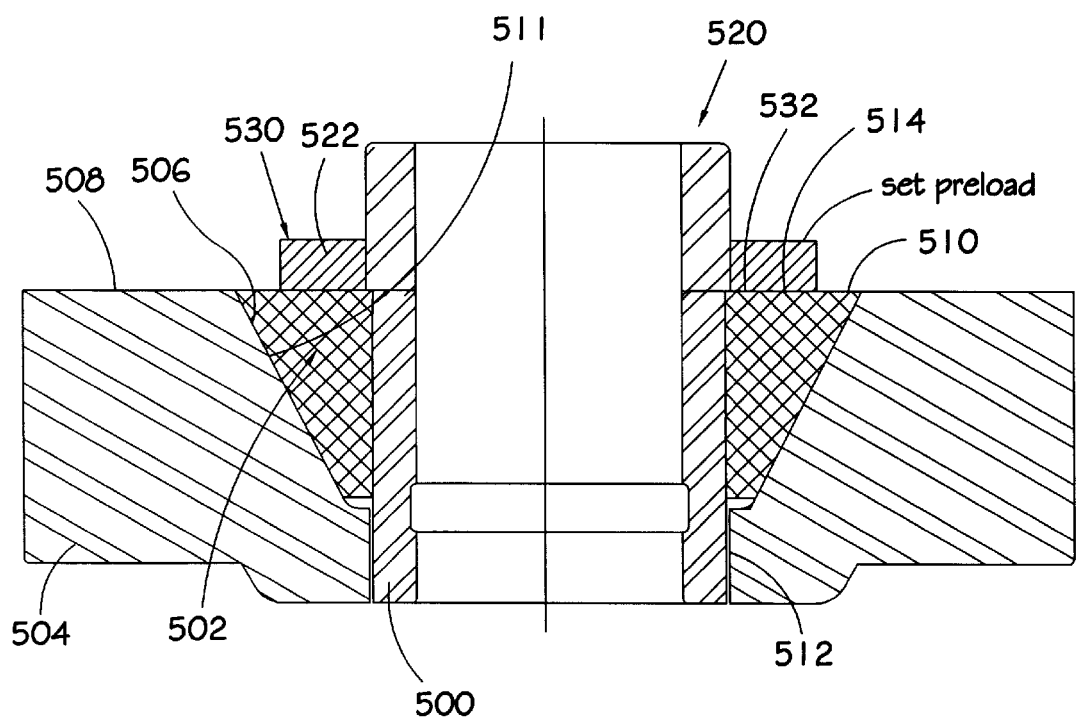
FIG. 5 is a vertical sectional view of a discrete fluid dynamic bearing where the fluid is air.

FIG. 5 shows an alternative embodiment, modified to use air as the fluid and to optimize the construction of the design to utilize air. Specifically, the features of the sleeve 500, cone 502 and bearing seat 504 are as previously described. The hydrodynamic bearing gap 506 is defined between facing surfaces 508, 510 of the seat and cone respectively and as also previously described; one of the two surfaces, preferably the bearing cone surface 506, includes a set of grooves for establishing pressure gradients to maintain the bearing function.

However, because the fluid is air, under many circumstances no special efforts need to be made to contain the air within the bearing gap 506. Therefore, the capillary seal which appears in the previous figures, including the shield cone and the seal shield, are removed, and replaced by a simple axial shield 510. At the opposite end of the bearing cone 502, the grooved pumping seal which appears in the earlier embodiments is also unnecessary; the surfaces that define the gap 512 may be left unmarked, although some grooving is potentially useful. The gap 512 between the bearing seat and the outer surface of the sleeve 500 becomes a non-critical dimension, as does the gap 514 between the shield 510 and the upper surface of the bearing cone 502. However, the gap 506 between surfaces 508, 510 is very fine, approximately 2 $\mu$m. Therefore, the method presented in this invention of setting this gap accurately and repetitively and thereby providing a discrete fluid dynamic bearing with the gap accurately pre-set is especially advantageous.

According to this method, the bearing seat is at rest or fixtured, to provide a base with a frame of reference for setting the gap. A force is applied axially (as generally indicated by the arrow 520) to the sleeve, while the positioning ring 522 is not yet tightly clasping the sleeve.

Imposition of this force causes the cone 502 to bottom out against the bearing seat 504 so that the fluid dynamic bearing gap 506 is substantially closed.

As with the designs previously described, the shield 510 is depressed much as a spring board would be by an axial force 530 applied to gap positioner 522, with the compression being to a distance of twice the gap to be set. For example, for a 2 $\mu$m gap, a compression of 4 $\mu$m of the end 532 of the shield 510 is achieved. As noted above, concurrently a force 520 in the axial direction 520 is applied to the sleeve, pushing the sleeve down so that the bearing cone 502 bottoms out against the inner surface of the seat 504.

The positioner ring 522 is now clamped in place against the surface of the sleeve 500, and against the upper surface of the shield 510. The shield positioner 510 is now released by relieving the force 530, causing it to return to its normal axial orientation. This allows the bearing cone to move up one half of the shield's original deflected distance as the shield 510 carries the positioner ring 522 and thereby the sleeve 500 axially with it, carrying the bearing cone 502 away from the bearing seat 504. The gap 506 between surfaces 508 of the bearing seat and 511 of the bearing cone has now been set at half of the distance which the shield was deflected. In this manner, the gap between cone and seat is reliably, repeatably reset, allowing the delivery of a discrete fluid dynamic bearing with a preset gap distance cross the gap of the hydrodynamic bearing.

To install the discrete bearing, a light axial force is again applied to the positioner ring so that it contacts, but does not deflect the shield 510. This step of course also moves the sleeve 500 and cone 502 axially, so that the gap is set accurate while the sleeve 500 which functions, in company with the cone 502, as the inner race; and seat 504, which functions as the outer bearing race, are bonded in place.

Other features and advantages of the present invention will become apparent to a person of skill in the art who studies the present invention disclosure. Many alternatives are available, including the use of a curved surface for either the outer surface of the bearing cone or the inner surface of the bearing seat. Other gap widths may also be established as being preferable for certain configurations. Therefore, the scope of the present invention is to be limited only by the following claims.

What is claimed is:

1. A discrete fluid dynamic bearing comprising a fluid dynamic bearing including a bearing cone mounted on a sleeve and defining in cooperation with a bearing seat having a surface facing an outer surface of said bearing cone across a fluid bearing gap, first sealing means comprising means for establishing a pressure gradient from a distal end of said sleeve toward said gap of said fluid dynamic bearing, and a second sealing means on an opposite side of said fluid dynamic bearing from said first sealing means for establishing a positive, higher pressure toward said fluid bearing gap, the pressure established by said first and second sealing means maintaining the fluid in said gap during relative rotation of said surfaces of said fluid dynamic bearing.

2. A discrete fluid dynamic bearing as claimed in claim 1 wherein said second sealing means comprises first and second adjacent region formed on a portion of a bearing seat surrounding said sleeve adjacent said hydrodynamic bearing, said first region being relatively wider in an axial dimension than said second region and comprising means for storing fluid when said sleeve and said sleeve-like surrounding region are at rest, said second region comprising means cooperating with said first region for establishing sealing stiffness adjacent said hydrodynamic bearing when said sleeve and said bearing seat are in relative rotational motion.

3. A discrete fluid dynamic bearing as claimed in claim 2 wherein said first region comprises closely spaced substantially helical grooves capable of retaining said fluid when said sleeve is at rest and for pumping said fluid into said second region when said sleeve and shaft are rotating relative to one another.

4. A discrete fluid dynamic bearing as claimed in claim 3 wherein said second region is an ungrooved region closely spaced from said sleeve so that fluid between said sleeve and said bearing seat establishes substantial stiffness across the seal.

5. A discrete fluid dynamic bearing as claimed in claim 4 wherein the ratio of the axial length of said first region to the axial length of said second region is about 3:1.

6. A discrete fluid dynamic bearing as claimed in claim 1 wherein said first sealing means comprises a centrifugal capillary seal comprising a reservoir defined by a pair of relatively diverging generally radial walls having a gap which narrows from the distal end of said sleeve toward said fluid dynamic bearing to create the pressure gradient.

7. A discrete fluid dynamic bearing as claimed in claim 6 wherein said herringbone pattern comprises means for establishing said pressure gradient from said first sealing means toward said second sealing means in said hydrodynamic bearing.

8. A discrete fluid dynamic bearing as claimed in claim 6 wherein said reservoir is at least partially filled with fluid, and a meniscus is formed across said fluid to prevent said fluid from leaving said reservoir toward the distal end of the shaft or sleeve.

9. A discrete fluid dynamic bearing as claimed in claim 6 wherein said generally, radial wall of said bearing seat diverges from the generally radially extending wall of the cone mounted on the sleeve to form said meniscus of said capillary seal.

10. A discrete fluid dynamic bearing as claimed in claim 6 wherein said bearing cone includes flow passages defined between said bearing cone and said sleeve communicating with a passage along a radial wall of said bearing cone to allow said fluid to circulate around said bearing cone.

11. A discrete fluid dynamic bearing as claimed in claim 10 wherein said flow passages between said cone and said sleeve are defined by grooves in a rear surface of said bearing cone.

12. A discrete fluid dynamic bearing as claimed in claim 6 including a top seal cone affixed to an outer surface of said sleeve and cooperating with said generally radial surface of said seal shield to define one of said walls of said reservoir of said capillary seal, a meniscus being formed from the wall of said seal shield to a facing surface of said seal cone.

13. A discrete fluid dynamic bearing as claimed in claim 6 including a sealing cone affixed to an outer surface of said sleeve and having a acute angled wall defining one of said radial walls of said reservoir, said reservoir being defined between said acute angled wall of said sealing cone and an acute angled wall of said sleeve, said acute angled wall tapering together toward an apex of said sealing cone.

14. A fluid dynamic bearing as claimed in claim 13 further including a cone gap positioning ring surrounding said sleeve adjacent an end of said hub defining a portion of said centrifugal capillary seal, said positioner ring also serving as a protector for said fluid dynamic bearing during shipment.

15. A method of setting gaps in said fluid dynamic bearing of claim 14 including pressing said gap positioner ring thereby said sleeve and said bearing cone a known distance relative to said bearing seat, thereby closing said gap between said face of said bearing cone and said face of said bearing seat, and thereby allowing said hub to return said positioner ring and said sleeve to return said sleeve and cone to an equilibrium position, thereby setting said gap between said bearing cone and said bearing seat.

16. A discrete fluid dynamic bearing as claimed in claim 13 wherein said reservoir is in fluid communication with a gap of said hydrodynamic bearing at said apex.

17. A discrete fluid dynamic bearing as claimed in claim 13 wherein said sealing cone further includes a generally radial surface facing said radial surface of said bearing cone and defining a gap therewith in communication with said gap of said hydrodynamic bearing.

18. A discrete fluid dynamic bearing as claimed in claim 17 wherein rotation of said sleeve relative to said sealing cone creates pressure due to centrifugal force on bearing fluid in said reservoir to force said fluid toward a common apex of said sealing cone and said bearing cone whereby said fluid is maintained within said reservoir.

19. A discrete fluid dynamic bearing as claimed in claim 18 wherein one of said surfaces of said bearing cone and said relatively rotating element has grooves thereon to create pressure away from said apex of said bearing cone toward a narrow end of said bearing cone, air bubbles which appear in said fluid moving against said pressure to said apex of said bearing cone and through said reservoir to an open end of said reservoir.

20. A discrete, self-contained fluid dynamic bearing comprising a sleeve supporting on its outer surface a bearing cone and cooperating with a bearing seat having an inner surface; one of the surfaces comprising a shield axially spaced from a radial surface of said cone and supported from said bearing seat having grooves to establish and maintain fluid pressures so that an effective fluid bearing is defined.

21. A fluid dynamic bearing comprising a shaft, first means mounted on said shaft for defining one side of a fluid dynamic bearing gap, second means defined by or integrated with a bearing seat for defining the other side of said bearing gap, fluid means for supporting said first and second means for relative rotation, and positioning means for defining the relative position of said first and second means to define said gap.

22. A fluid dynamic bearing as claimed in claim 21 including shield means for cooperating with said positioning means for defining spacing of said gap.

23. A fluid dynamic bearing as claimed in claim 22 wherein axial deflection of said shield means is in a fixed ratio to said gap.

* * * * *